United States Patent
Gao et al.

(10) Patent No.: US 9,966,786 B2
(45) Date of Patent: May 8, 2018

(54) METHOD, SYSTEM AND APPARATUS TO OPTIMIZE WIRELESS CHARGING AND FM RECEPTION

(71) Applicant: INTEL CORPORATION, Santa Clara, CA (US)

(72) Inventors: Jie Gao, Sunnyvale, CA (US); Songnan Yang, San Jose, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 14/862,585

(22) Filed: Sep. 23, 2015

(65) Prior Publication Data
US 2017/0085114 A1    Mar. 23, 2017

(51) Int. Cl.
  *H04W 4/00* (2018.01)
  *H02J 7/02* (2016.01)
  *H04L 27/16* (2006.01)
  *H02J 50/12* (2016.01)

(52) U.S. Cl.
  CPC .............. *H02J 7/025* (2013.01); *H02J 50/12* (2016.02); *H04L 27/16* (2013.01); *H04W 4/008* (2013.01); *Y02B 40/90* (2013.01)

(58) Field of Classification Search
  None
  See application file for complete search history.

(56) References Cited

U.S. PATENT DOCUMENTS

| | | | | |
|---|---|---|---|---|
| 2010/0114241 A1* | 5/2010 | Donofrio | ................. | A61N 1/37 607/59 |
| 2011/0187318 A1* | 8/2011 | Hui | ........................ | H02J 17/00 320/108 |
| 2011/0199045 A1* | 8/2011 | Hui | ..................... | H02M 3/3376 320/108 |
| 2014/0375258 A1* | 12/2014 | Arkhipenkov | .......... | H02J 7/025 320/108 |
| 2015/0256226 A1* | 9/2015 | Lin | ...................... | H04B 5/0037 307/104 |
| 2015/0326062 A1* | 11/2015 | Gonzalez Valdez | .... | H02J 17/00 320/108 |
| 2015/0362360 A1* | 12/2015 | Kovacs | .................. | G01G 19/44 177/245 |
| 2017/0077744 A1* | 3/2017 | Kim | ........................ | H02J 7/042 |
| 2017/0093197 A1* | 3/2017 | Gao | ........................ | H02J 7/025 |

OTHER PUBLICATIONS

Xiao Lu et al., Wireless Charger Networking for Mobile Devices: Fundamentals, Standards, and Applications, arXiv:1410.8635v2 [cs.NI], Dec. 9, 2014, 16 pages.

\* cited by examiner

*Primary Examiner* — David Bilodeau
(74) *Attorney, Agent, or Firm* — Patent Capital Group

(57) ABSTRACT

The disclosure generally relates to methods, system and apparatus to optimize wireless charging while allowing FM radio reception. In an exemplary embodiment, presence of an active FM radio on a wireless platform is detected and the active FM channel is identified. To reduce radio frequency interference between the wireless charging magnetic field and the FM channel, the PTU may adaptively shift the A4WP frequency. The disclosed embodiments improve user experience with FM radios in wireless charging systems.

13 Claims, 7 Drawing Sheets

| 7 | 6 | 5 | 4 | 3 | 2 | 1 | 0 |
|---|---|---|---|---|---|---|---|
| NFC receiver | Separate BTLE radio in PRU | Power Control Algorithm Preference | Adjust power capability | Charge Complete Connected Mode | PRU Test Mode | FM radio in WC platform | RFU |
| 0 = Not supported 1 = Supported | 0 = Not supported 1 = Supported | 0 = V$_{RECT\_MIN\_ERROR}$ 1 = Max System Efficiency | 0 = Not supported 1 = Supported | 0 = Not supported 1 = Supported | 1 = Yes 0 = No | 0 = Not supported 1 = Supported | |

Fig. 3

METHOD, SYSTEM AND APPARATUS TO OPTIMIZE WIRELESS CHARGING AND FM RECEPTION

BACKGROUND

Field

The disclosure generally relates to a method, system and apparatus to optimize wireless charging stations. Specifically, the specification relates to methods, system and apparatus to optimize wireless charging while allowing FM radio reception.

Description of Related Art

Wireless charging or inductive charging uses a magnetic field to transfer energy between two devices. Wireless charging can be implemented at a charging station. Energy is sent from one device to another device through an inductive coupling. The inductive coupling is used to charge batteries or run the receiving device. The Alliance for Wireless Power (A4WP) was formed to create industry standard to deliver power through non-radiative, near field, magnetic resonance from the Power Transmitting Unit (PTU) to a Power Receiving Unit (PRU).

The A4WP defines five categories of PRU parameterized by the maximum power delivered out of the PRU resonator. Category 1 is directed to lower power applications (e.g., Bluetooth headsets). Category 2 is directed to devices with power output of about 3.5 W and Category 3 devices have an output of about 6.5 W. Categories 4 and 5 are directed to higher-power applications (e.g., tablets, netbooks and laptops).

PTUs of A4WP use an induction coil to generate a magnetic field from within a charging base station, and a second induction coil in the PRU (i.e., portable device) takes power from the magnetic field and converts the power back into electrical current to charge the battery. In this manner, the two proximal induction coils form an electrical transformer. Greater distances between sender and receiver coils can be achieved when the inductive charging system uses magnetic resonance coupling. Magnetic resonance coupling is the near field wireless transmission of electrical energy between two coils that are tuned to resonate at the same frequency.

Wireless charging is particularly important for fast charging of devices including smartphones, tablets and laptops. There is a need for improved wireless charging systems to extend the active charging area and to improve coupling and charging uniformity while avoiding disruption of nearby devices that may interfere with the generated magnetic field.

BRIEF DESCRIPTION OF THE DRAWINGS

These and other embodiments of the disclosure will be discussed with reference to the following exemplary and non-limiting illustrations, in which like elements are numbered similarly, and where:

FIG. 3 shows an exemplary PRU static parameter characteristic packet according to one embodiment of the disclosure;

DETAILED DESCRIPTION

Figure 1:
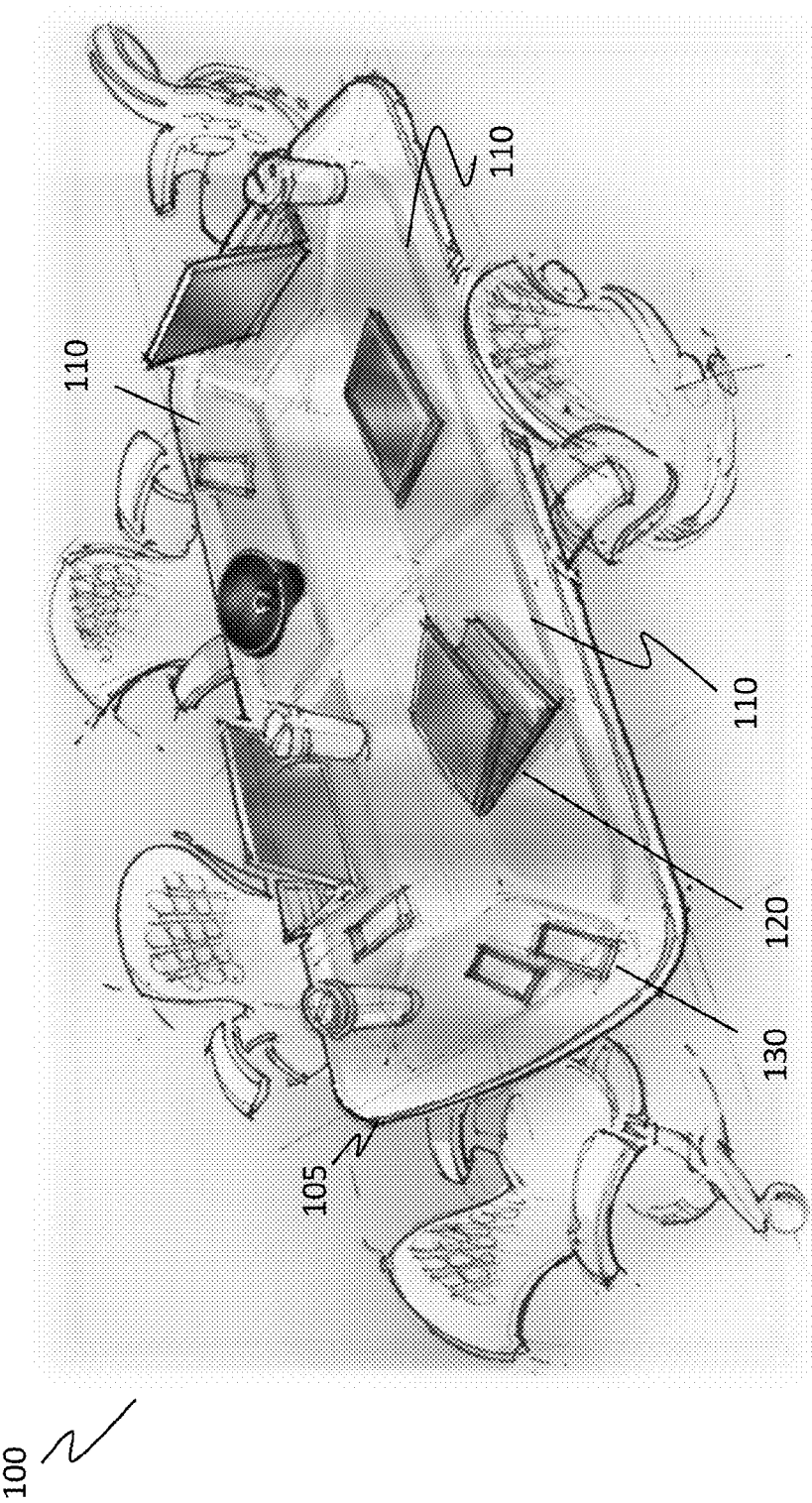
FIG. 1 illustrates an exemplary wireless charging environment according to one embodiment of the disclosure.

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.1 lad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HD™ specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Electromagnetic induction based Wireless charging and Near Field Communication (NFC) are based on inductive coupling between two coils. Wireless charging based on A4WP uses 6.78 MHz industrial, scientific or medical (ISM) frequency band to deliver power between wireless charger and device, while NFC (and some other RFID technologies) uses 13.56 MHz ISM frequency band to deliver power and data between devices.

FIG. 1 illustrates an exemplary wireless charging environment according to one embodiment of the disclosure. In FIG. 1, conference room 100 is shown with wireless charging pads (i.e., PTUs) 110 positioned on desk 105. Each PTU 110 is designated to support one or more PRUs. While FIG. 1 shows PRUs including laptop 120 and smart devices 130, the disclosed principles are not limited thereto and may include any device capable of wireless charging.

Figure 2:
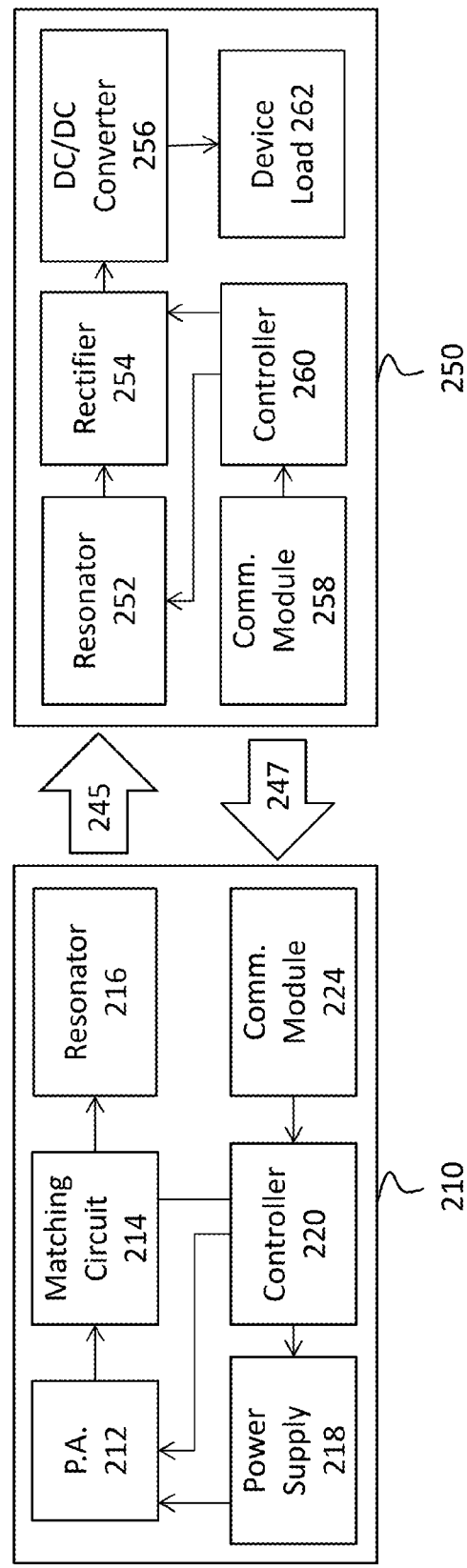
FIG. 2 schematically illustrates conventional A4WP architecture.

FIG. 2 schematically illustrates conventional A4WP architecture. Specifically, FIG. 2 shows PTU 210 and PRU 250. PTU 210 can be any conventional wireless charging station. PTU 210 includes power supply 218, power amplifier (PA) 212, matching circuit 214, controller 220, resonator coil 216 (interchangeably, resonator) and communication module 224. Communication module 224 may define BLE communication platform to transceive BLE packets and to communicate the packets to controller 220. PA 212 receives primary power from power supply 218 (which may be an AC source) and generates an amplified A4WP power signal according to instructions from controller 220. Matching circuit 214 receives A4WP power signals from PA 212 and provides substantially constant power to resonator 216. Resonator 216 may include one or more resonator coils to convert output from matching circuit 214 to magnetic field for a wireless device positioned within the charging zone of PTU 210.

PRU 250 may define any device under charge (DUC) which is proximal to PTU 210. PRU 250 is shown with resonator coil 252, rectifier 254, DC/DC converter 256, communication module 258, controller 260 and device load 262. Communication module 258 includes BLE communication platform to communicate 247 with communication module 224 of PTU 210. Resonator coil 252 receives magnetic field 245 of PTU resonator 216. Rectifier 254 conforms magnetic field (power) received at resonator 252 and provides appropriate signal to DC/DC converter 256. Controller 260 of PRU 250 communicates with resonator 252 and rectifier 254 in order to manage received power. The output of DC/DC converter 256 powers device load (e.g., battery) 262.

Conventional PRUs include smartphones and other devices that are equipped with radio transceivers. The radio transceiver may receive one or more of Frequency Modulation (FM) or Amplitude Modulation (AM) radio signals. Conventional FM radios operate in the frequency spectrum of about 88 to 108 MHz. Many PRUs support and use, for example, FM radio while charging the device. Due to radio frequency interference (RFI) between magnetic field generated for wireless charging and the FM channel being used, the system performance and user experience may be significantly impacted. RFI may be caused by the harmonics of the A4WP power transfer fundamental frequency at 6.78 MHz. The current A4WP specifications does not specify any FM related fields or process to address RFI. In such systems RFI reduces user experience.

Certain embodiments of the disclosure addresses co-existence between magnetic charging field and use of the radio in the DUC. In an exemplary embodiment, the presence of FM radio is initially detected. Once detected, the PTU may display an indication on the charging mat or otherwise notify the user of potential interference. In another exemplary embodiment, the PTU adaptively shifts the A4WP frequency to minimize and/or substantially eliminate the RFI with the selected radio channel. In still another embodiment, the PTU adaptively changes the fundamental frequency of the A4WP charging field to reduce and/or substantially eliminate RFI.

For devices with fully integrated wireless charging, the PRU is aware of the FM radio capability and whether it is being used. This information may be communicated to the wireless charging platform via Inter Integrated Circuit (I2C) or the Universal Asynchronous Receiver/Transmitter (UART) bus interfaces. To reduce RFI, the PRU may communicate the FM radio information including whether the FM radio is active; and if active, report the active radio channel to the PTU. In one implementation, this communication is made through PRU's Static and Dynamic Parameter Characteristic value fields. For example, the Static Parameter Characteristics may be used to communicate presence of an FM radio on the DUC. The Dynamic Parameter Characteristic may be used to communicate the FM radio active state and the channel which is being used on the DUC's radio.

Upon detection of FM radio usage, the PTU may optionally display an indication on the charging mat to notify the user of a potential RFI. The PTU may also adaptively shift the A4WP frequency in the PTU to minimize RFI with the radio operation. By way of example, FM radio has narrow bandwidth at 15 KHz for mono audio and 30 KHz for stereo audio. Shifting the A4WP 6.78 MHz clock by +/−0.05% can change the harmonic frequency of charging signal by at least +/−40 KHz. This moves the frequency harmonics outside of the FM communication channel and reduces the in-band RFI with the FM radio channel. Further, the disclosed adaptive wireless charging embodiment is regulatory-compliant because the maximum frequency shift required to mitigate RFI is less than the allowed ISM bandwidth of 6.78 MHz and its harmonics.

To standardize the implementation of FM radio detection and adaptive A4WP frequency shift, an embodiment of the disclosure provides a method to convey FM radio information between PTU and PRU. The information may be conveyed using BLE packets, NFC or other communication modes between PRU and PTU. In an exemplary embodiment, the information is communicated to the PTU through a PRU's Static Parameter Characteristic Value (SPCV) fields. The current A4WP specification provides the PRU SPCV fields to be 20 octets long. The information may be transmitted as a BLE packet as the initial communication transmitted to PTU, for example, during the so-called handshake process.

FIG. 3 shows an exemplary PRU SPCV packet according to one embodiment of the disclosure. Specifically, FIG. 3 shows packet 300 having bit fields 0-7. The purpose of each bit is provided at row 310. For example, bit 0 is identified as reserved for future use (RFU), bit 1 indicates whether the PRU is associated with an FM radio, bit 2 indicates whether the PRU requests PTU to enter PTU test mode. Bit 3 provides whether charge complete connection mode is supported, bit 4 indicates whether the PRU has adjustable power, bit 5 provides the PRU's power control algorithm, bit 6 indicates whether a separate BLE radio transceiver (BLE) is associated with the PRU, and bit 7 indicates whether the PRU supports NFC. Row 320 can be 0 or 1 depending on availability. As stated, the PRU transmits an SPCV packet 300 at the start of communication with the PTU. Thus, in an embodiment of the disclosure, bit 2 is set to 1 to indicate presence of an FM radio in the wireless device being charged (WC).

Pursuant to the current A4WP standard, after the handshake step, PRU communicates with the PTU during regular intervals by sending PRU dynamic parameter characteristic. The length of the PRU dynamic parameter characteristic value is 20 octets. Under the current A4WP standards, the $19^{th}$ and $20^{th}$ Octets are designated as RFU. In one embodiment, the disclosure relates to setting the 19th octet with information indicating the channel used by the FM radio associated with the PRU when the FM radio is active. Because the PRU dynamic parameter characteristic packet is communicated every 250 m·sec., the PRU may keep PTU continually informed of the active radio station.

Figure 4:
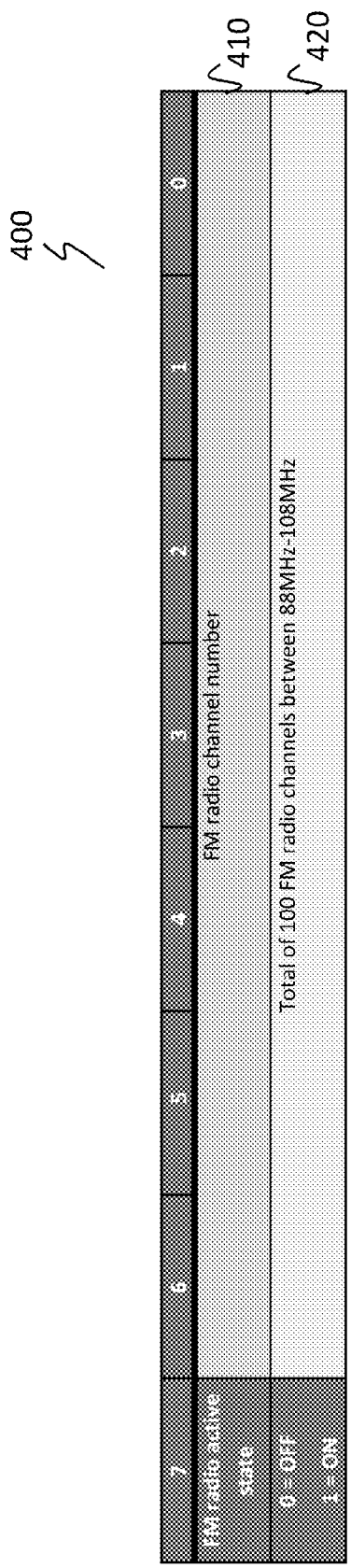
FIG. 4 is an exemplary PRU dynamic parameter characteristic packet according to one embodiment of the disclosure.

FIG. 4 shows an exemplary PRU Dynamic Parameter Characteristic Value (DSPCV) packet according to one embodiment of the disclosure. In packet 400 of FIG. 4, bits 0-7 of row 410 may be allocated to the radio channel identification. Thus, 127 ($2^7$-1) different radio channels may be identified in packet 400. Currently, there are only 100 FM radio stations in the FM frequency spectrum. Bit 7 in row 410 may be used to specify if the FM radio is currently turned ON or OFF. Bit 0-6 in row 420 may be used to specify the FM radio channel or frequency spectrum. Because the PRU dynamic characteristic information is transmitted regularly, the PTU will remain continually informed as to whether the DUC includes an FM radio and what FM channel is being used. As described in detail below, the PTU may use this information to adjust fundamental frequency of the magnetic field to avoid radio frequency interference (RFI) between the harmonics of the fundamental charging frequency and the active FM radio channel (spectrum).

Figure 5:
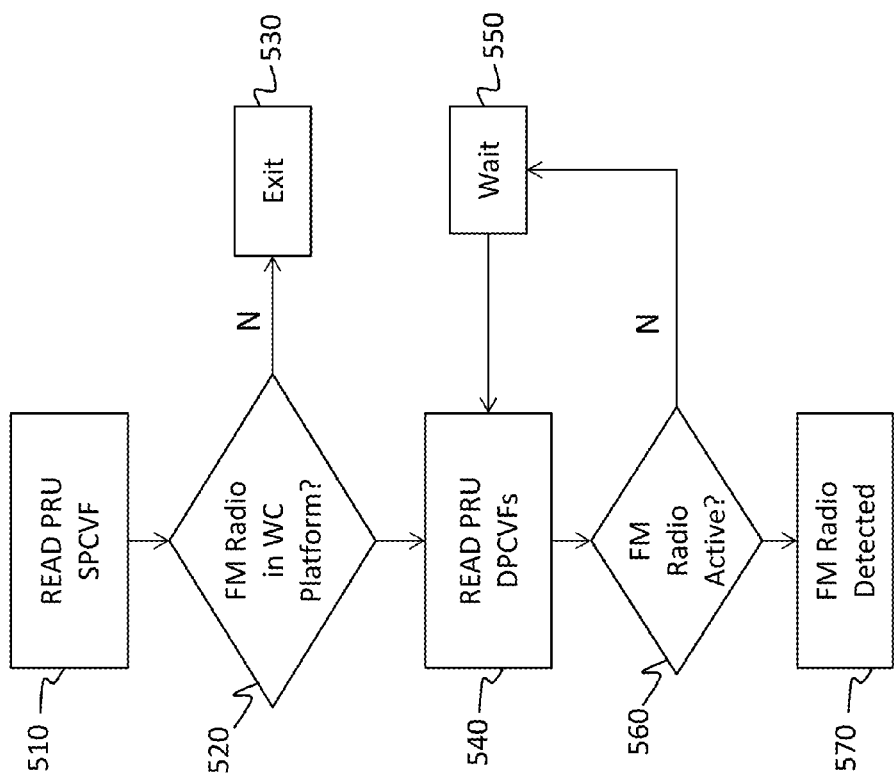
FIG. 5 shown an FM radio detection flow chart according to an embodiment of the disclosure.

FIG. 5 shows an FM radio detection flow chart according to an exemplary embodiment of the disclosure. The process of FIG. 5 starts at step 510 when the PTU reads the PRU's Static Parameter Characteristic Value Field (SPCVF). At step 520, the PTU determines whether an FM radio exists in the wireless device being charged. If the DUC includes, or is associated with, an FM radio, the PTU (and/or a controller circuitry associated with the PTU) may receive indication through SPCVF packet. The PTU may then store this information in addition to any indicator identifying the DUC (e.g., MAC address) in a memory for future reference.

If the SPCVF packet does not indicate presence of FM radio on the wireless DUC, at step 530, the flow chart ends. At this point, wireless charging of the DUC may continue without interruption. If an FM radio is present, then at step 540 the PTU reads PRU's Dynamic Parameter Characteristic Value Fields (DPCVFs). As stated, DPCVF packets are transmitted at regular intervals. The DPCVF packets may indicate: (1) whether an FM radio is active, and/or (2) what FM channel is active. At step 560, determination is made as to whether the DUC has an active FM channel. If no FM channel is active, at step 550, the PTU may hold or wait for a given period and then repeat step 540. If an FM channel is reported in the DPCVF packets, the PTU may reach conclusion at step 570 that FM radio is active on the identified channel. Once an active channel is identified, the PTU may change the fundamental frequency of the magnetic field in order to reduce or substantially eliminate interference between harmonics of the fundamental frequency and the active FM radio channel.

Once the detected FM radio is validated and is known to be active, the PTU may display a message on the charging mat to notify the user of a potential RFI. The PTU may also sound an alarm or use different measures to notify the user. In an exemplary embodiment, the PTU may adaptively shift the A4WP charging frequency to minimize the RFI interference on the FM radio operating channel.

Figure 6:
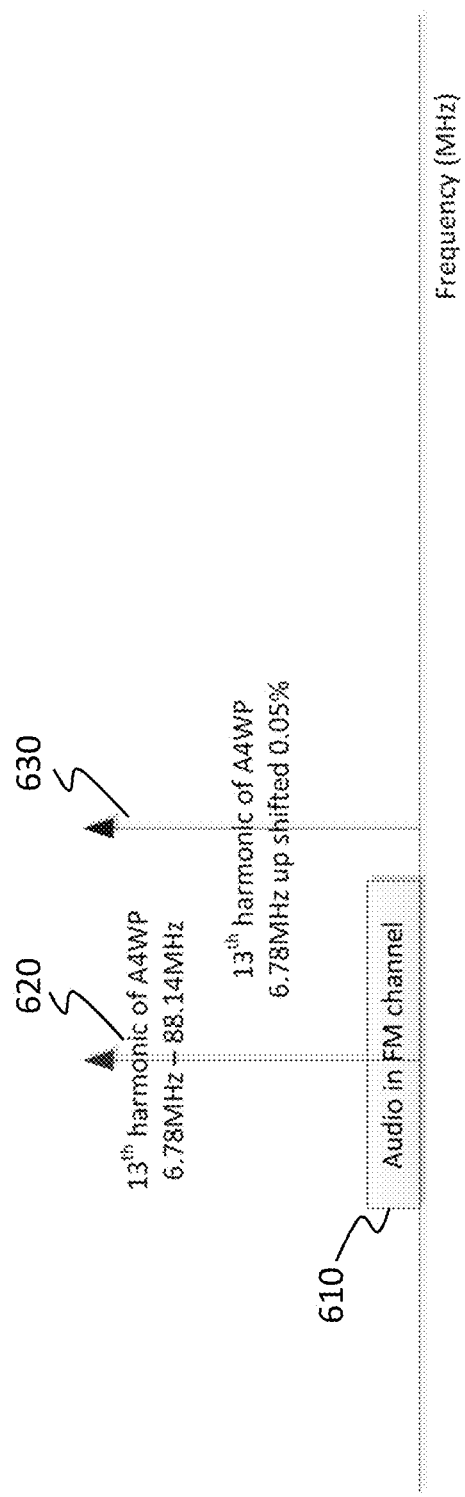
FIG. 6 schematically illustrates radio frequency interference between A4WP magnetic field and an FM radio channel.

FIG. 6 schematically illustrates radio frequency interference between A4WP magnetic field and an FM radio channel. The x-axis of FIG. 6 represents the FM frequency and spectrum 610 represents the FM radio band. According to the A4WP standard, the fundamental frequency of the magnetic field is at 6.78 MHz. The FM radio band is between 88 and 108 MHz. Accordingly, interference may exist between harmonics of the magnetic field's fundamental frequency and the active FM band. In FIG. 6, this relationship is shown as line 620 where the $13^{th}$ harmonic of A4WP magnetic field overlaps the FM audio channels. If the fundamental frequency is shifted by as little as 0.05%, the resulting harmonics also changes as shown by line 630. The shifted harmonics are clearly outside of the FM audio channel and no longer cause RFI. Thus, the 13th harmonic of A4WP frequency falls outside of the FM radio channel of 88.1 MHz. This change in fundamental frequency can be made, for example, by up-shifting the A4WP clock which controls the oscillating signal and the resulting fundamental frequency. The up-shifting or down-shifting may extend to 15 MHz and still fall within the allotted regulatory limits of A4WP. The shifting of 0.05% at FM radio channel is about 40-50 KHz.

Figure 7:
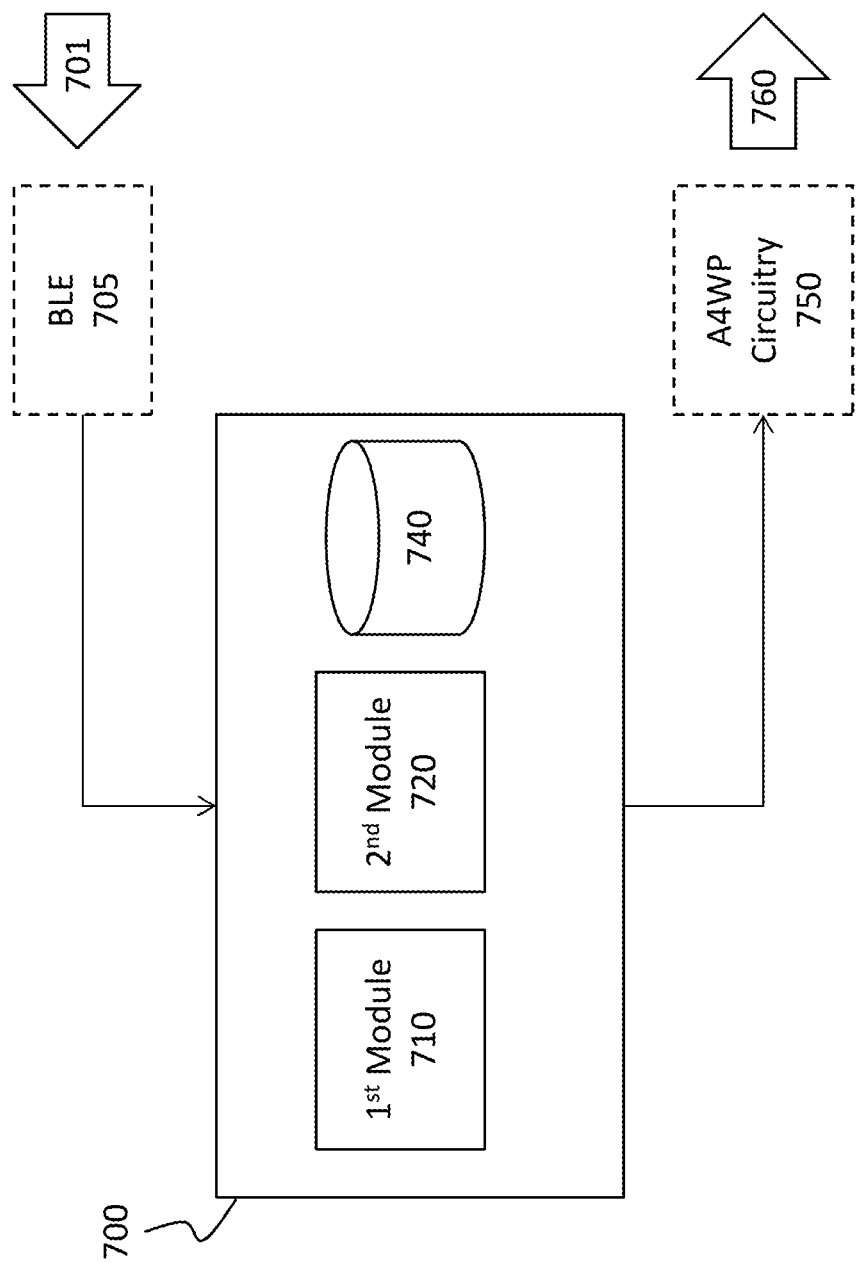
FIG. 7 shows an exemplary controller circuitry according to one embodiment of the disclosure.

FIG. 7 shows an exemplary controller circuitry (interchangeably, controller) according to an embodiment of the disclosure. Controller circuitry 700 may be integrated with a PTU or maybe a stand-alone device to communicate with the PTU's A4WP circuitry. Controller 700 may include hardware, software or a combination of hardware and software. By way of example, controller 700 may be a virtual controller. Controller 700 may communicate with BLE platform 705. BLE platform may receive BLE advertising packets 701 from a PRU (not shown). It should be noted that the disclosed principles are not limited to BLE communication platform and apply equally to all other communication platforms. The BLE packets may provide PRU SPCVF. According to one embodiment, the PRU SPCVF may indicate whether the wireless device being charged has an FM or other radio transceivers which may cause RFI with the A4WP magnetic field. BLE 705 may also receive PRU DPCVF packets indicating that the radio transceiver (e.g., FM radio) is active on a given channel. BLE platform 705 may convey this information to controller 700.

While controller 700 is shown with exemplary processor modules 710 and 720, the controller may have more or less processor modules. Each processor module may comprise hardware, software or a combination of hardware and software. The processor modules may define, for example, a virtual processor. Memory 740 may store instructions to be executed on the processor modules to cause the processor modules to implement steps necessary to identify presence of an active transceiver, determine existence of RFI and direct the A4WP circuit 750 to shift the magnetic field's fundamental frequency to reduce and/or substantially eliminate interference. Controller 700 may be programmed with instructions to implement the process shown in FIG. 5.

In an exemplary embodiment, first processor module 710 may be configured to identify presence of a proximal radio transceiver by analyzing one or more of PRU's SPCVF or DPCVF. First module 710 or second module 720 may then determine whether RFI exists between the A4WP charging field and the active radio channel. RFI may exist between the active channel of the radio platform and one or more harmonics of the fundamental charging frequency. If RFI exists, second module 720 may calculate an optimal magnetic field to reduce and/or substantially eliminate RFI. Once, optimal magnetic field (and its fundamental frequency) are identified, second module 720 may direct A4WP circuitry to produce the same as schematically illustrated by arrow 760.

The following non-limiting examples further illustrates different embodiments of the disclosure. Example 1 is directed to a Power Transmission Unit (PTU), comprising: a charging circuitry to generate magnetic field having a first fundamental frequency; a communication platform to communicate with an external device; a controller to communicate with the communication platform and with the charging circuitry, the controller to receive indication from the communication platform that the external device is equipped to receive radio signal.

Example 2 is directed to the PTU of example 1, wherein the radio signal is a Frequency Modulation (FM) signal.

Example 3 is directed to the PTU of example 1, wherein the controller is further configured to receive indication of radio signal frequency and to determine if a frequency harmonic of the first fundamental frequency interferes with the radio signal.

Example 4 is directed to the PTU of example 3, wherein the controller is further configured to shift the first fundamental frequency to a second frequency to substantially reduce interference with the radio signal.

Example 5 is directed to the PTU of example 2, wherein the controller is further configured to initiate an alarm if the first fundamental frequency interferes with the radio signal.

Example 6 is directed to the PTU of example 1, wherein the controller further comprising a processor circuitry and a memory circuitry, the memory circuitry communicating instructions to the processor circuitry to determine if the magnetic field of the first frequency interferes with the radio signal.

Example 7 is directed to the PTU of example 1, wherein the communication platform is one of Bluetooth Low Energy (BLE) or Near-Field Communication (NFC).

Example 8 is directed to a mobile device, comprising: a resonator coil to receive a magnetic field from a wireless charging device to charge the mobile device; a first module to transmit the first data packet, the first data packet indicating presence of a radio receiving platform on the mobile device; and a second module to periodically transmit a second data packet, the second data packet indicating an active radio state and a frequency spectrum used by the radio receiving platform; wherein the first data packet including an indication of radio receiving platform at a Static Parameter Characteristic Value field and wherein the second data packet includes indication of the active radio state and the radio frequency spectrum at a Dynamic Parameter Characteristic Value field.

Example 9 is directed to the mobile device of example 8, wherein at least one of the first or the second data packets comprise a Bluetooth Low Energy data packet.

Example 10 is directed to the mobile device of example 9, wherein the first data packet is transmitted only at an initial communication with a wireless charging device.

Example 11 is directed to the mobile device of example 9, wherein the second data packet is transmitted at a frequency of about once every 200 msec.

Example 12 is directed to a method for wirelessly charging an external device, the comprising: generating a first magnetic field having a first fundamental frequency; receiving indication of presence of a transceiver proximally located; receiving indication of radio reception at the a proximal radio; determining whether the first magnetic field interferes with the radio reception at the proximal radio; generating a second magnetic field having a second fundamental frequency if interference is detected.

Example 13 is directed to the method of example 12, wherein the step of receiving indication of radio reception further comprises receiving frequency spectrum used for the radio reception.

Example 14 is directed to the method of example 13, wherein the frequency spectrum defines a Frequency Modulation (FM) channel.

Example 15 is directed to the method of example 14, further comprising determining whether one or more harmonics associated with the first fundamental frequency interferes with the FM Channel.

Example 16 is directed to the method of example 12, wherein generating the second magnetic field having further comprises identifying the second fundamental frequency not interfering with the detected radio reception.

Example 17 is directed to the method of example 12, wherein receiving indication of presence of the transceiver further comprises receiving a Bluetooth Low Energy (BLE) or an NFC signal.

Example 18 is directed to the method of example 12, further comprising initiating an alarm if interference is detected.

Example 19 is directed to a non-transitory machine-readable medium comprising instructions executable by a processor circuitry to perform steps to wirelessly charge an external device, the instructions directing the processor to: generate a first magnetic field with a first fundamental frequency; receive indication of a proximal transceiver; receive indication of radio reception at the proximal transceiver; determine whether the first magnetic field interferes with the radio reception at the proximal transceiver; and generate a second magnetic field having a second fundamental frequency if interference is detected.

Example 20 is directed to the non-transitory machine-readable medium of example 19, wherein the transceiver receives signals on an FM channel.

Example 21 is directed to the non-transitory machine-readable medium of example 21, wherein the instructions further cause the processor to receive indication of a proximal transceiver in the form of a Static Parameter Characteristic Value packet.

Example 22 is directed to the non-transitory machine-readable medium of example 21, wherein the instructions further cause the processor to receive indication of a proximal transceiver in the form of one or more Dynamic Parameter Characteristic Value packets.

Example 23 is directed to the non-transitory machine-readable medium of example 22, wherein the Dynamic Parameter Characteristic Value packets identify an active radio channel.

While the principles of the disclosure have been illustrated in relation to the exemplary embodiments shown herein, the principles of the disclosure are not limited thereto and include any modification, variation or permutation thereof.

What is claimed is:

1. A Power Transmission Unit (PTU), comprising:
   a charging circuitry to generate magnetic field having a first fundamental frequency;
   a communication platform to communicate with an external device, wherein the communication platform is to receive a packet from the external device to start communications with the PTU and the packet comprises a particular field defined to indicate whether the external device is equipped to receive a particular type of radio signal;
   a controller to communicate with the communication platform and with the charging circuitry, the controller to receive indication from the communication platform that the external device is equipped to receive particular type of radio signal based on the packet.

2. The PTU of claim 1, wherein the particular type of radio signal is a Frequency Modulation (FM) signal.

3. The PTU of claim 2, wherein the controller is further configured to initiate an alarm if the first fundamental frequency interferes with the particular type of radio signal.

4. The PTU of claim 1, wherein the controller is further configured to receive indication of radio signal frequency and to determine if a frequency harmonic of the first fundamental frequency interferes with the particular type of radio signal.

5. The PTU of claim 4, wherein the controller is further configured to shift the first fundamental frequency to a second frequency to substantially reduce interference with the particular type of radio signal.

6. The PTU of claim 1, wherein the controller further comprising a processor circuitry and a memory circuitry, the memory circuitry communicating instructions to the processor circuitry to determine if the magnetic field of the first frequency interferes with the particular type of radio signal.

7. The PTU of claim 1, wherein the communication platform is one of Bluetooth Low Energy (BLE) or Near-Field Communication (NFC) platform.

8. The PTU of claim 1, wherein the packet comprises a plurality of fields including the particular field, and each of the plurality of fields is to include data to indicate to the PTU whether the external device supports a corresponding one of a plurality of capabilities.

9. The PTU of claim 1, wherein the particular field comprises a single bit.

10. The PTU of claim 1, wherein the packet is defined according to an Alliance for Wireless Power (A4WP) standard.

11. The PTU of claim 1, wherein the packet is received from the external device over a wireless communication.

12. The PTU of claim 1, wherein the wireless communication comprises a Bluetooth Low Energy (BLE) communication.

13. The PTU of claim 1, wherein the wireless communication comprises a Near-Field Communication (NFC) communication.

* * * * *